United States Patent
Naqvi et al.

[11] Patent Number: 6,014,143
[45] Date of Patent: Jan. 11, 2000

[54] RAY TRANSFORM METHOD FOR A FAST PERSPECTIVE VIEW VOLUME RENDERING

[75] Inventors: Hasan Shahzad Naqvi; Russell Huonder, both of Ft. Collins; Barthold Lichtenbelt, Fort Collins, all of Colo.

[73] Assignee: Hewlett-Packard Company, Palo Alto, Calif.

[21] Appl. No.: 08/865,756

[22] Filed: May 30, 1997

[51] Int. Cl.$^7$ ................................................. G06F 15/00
[52] U.S. Cl. ........................... 345/424; 345/427; 345/421
[58] Field of Search .................................. 345/424, 427, 345/421, 419

[56] References Cited

U.S. PATENT DOCUMENTS

| | | | |
|---|---|---|---|
| 5,519,401 | 5/1996 | Farmer et al. | 342/185 |
| 5,566,282 | 10/1996 | Zuiderveld | 345/424 |
| 5,787,889 | 8/1998 | Edwards et al. | 128/660.07 |

FOREIGN PATENT DOCUMENTS

| | | | |
|---|---|---|---|
| 2 272 137 | 5/1994 | United Kingdom | G06F 15/72 |

OTHER PUBLICATIONS

Foley, van Dam, Feiner, & Hughes Computer Graphics, Second Edition, Copyright 1990 pp. 212–227; 229–237;252–259;278–281;548–551;700–717;866–871;914–915;1034–1

*Primary Examiner*—Mark K. Zimmerman
*Assistant Examiner*—Motilewa Good-Johnson

[57] ABSTRACT

A ray transform method for performing 3D spacial volume transformation for perspective view rendering of a volume data set on a 2D graphics display. A backward mapping approach is used whereby each destination point along a ray is transformed and resampled from the source. The rays converge at the center of projection, or the eye pont, from the projection plane for the perspective view desired. Each ray has a unique ray transform matrix which is combined with an orthographic model view matrix to yield a combined inverse matrix. The floating point values of the combined inverse matrix are coded into a 32 bit fixed point format having 16 bits of scalar and 16 bits of fraction. Once this coding has been done, then transforming consecutive points along a destination ray becomes simple integer adds. The method supports two resampling techniques, nearest neighbor and trilinear interpolation.

28 Claims, 8 Drawing Sheets

RAY TRANSFORM METHOD FOR A FAST PERSPECTIVE VIEW VOLUME RENDERING

CROSS REFERENCE TO RELATED APPLICATIONS

This application is related to application Ser. No. 08/866,859 filed May 30, 1997 entitled *Fixed-Point Method for Fast and Precise 3D Spatial Transformations* of Shaz Naqvi, Barthold Lichtenbelt, and Russell Huonder.

FIELD OF THE INVENTION

This invention relates to computer systems, and more particularly to graphic display of discrete objects within computer systems. Even more particularly, this invention relates to volume rendering of volume data sets for graphic display within computer systems and a ray transform method for a fast perspective view volume rendering.

BACKGROUND OF THE INVENTION

Volume rendering is an important branch of computer graphics, following behind the development of geometric rendering and pixel rendering. Volume rendering refers to the direct rendering of a volume data set to show the characteristics of the interior of a solid object when displayed on a 2D graphics device. A volume data set is a three-dimensional array of voxels. Voxels have been defined as sample points separated by a finite distance. Each voxel has a position and a value. The voxel position is a three-tuple specifying an x, y, and z position within the 3D voxel array. The voxel value depends upon its format. For example, a voxel has an intensity element and may have an index element. These elements are usually treated differently in the volume rendering process. The collection of values for all points in the volume is called a scalar field on the volume.

Volume data sets can be generated by numerous means, but most commonly by some method of 3D scanning or sampling and by numerical modeling. For example, a volume data set may be generated by Magnetic Resonance Imaging, or MRI, wherein the density of human or animal tissue is computed at each point of a 3D grid. A display of this information could indicate the boundaries of the various types of tissue, as indicated by density changes. Volume rendering is the process of displaying this data on a 2D graphics device.

The very first voxel in a volume data set with the coordinates (0,0,0) is considered to be the origin of the volume data set. The three coordinates, in order, correspond to the column, row, and slice of the image in the volume data set.

Volume data sets can be quite large and thus can place a strain on system resources. For example, a typical volume data set from a MRI scanner may contain 6.7 million voxels or more, whereas polygon data sets for geometric rendering typically contain less than ½ million polygons. Thus, there is a much greater need for hardware acceleration when rendering volumes.

In volume rendering there is often a need to be able to view the rendered image from various orthographic and perspective projections. Studies have shown that when viewing such renderings over long periods of time, perspective views are less strenuous on the observer than are orthographic views. Also, perspective renderings often give a better visual cue for spacial perception than orthographic renderings. Thus, a key step in the volume rendering process is the 3D spatial volume transformation of the original volume data set for orthographic or perspective rendering. Typical types of transformations required for both orthographic or perspective rendering may include zoom, pan, rotation, and even shear of the input volume for projection into an output raster type display device. Once a transformation has been done, various resampling techniques must be applied, such as nearest neighbor or trilinear interpolation, to determine pixel values for rendering.

Typically, a perspective view of a volume data set is realized by depicting objects that are farther away from the viewer as being smaller than objects that are closer to the viewer. Geometric objects are rendered in perspective by dividing x, y, and z locations of vertices of the geometric object by the w, or homogeneous coordinate, after a model and view transformation have been performed. In addition, the homogeneous coordinate w modulates the degree of perspective distortion.

Geometric objects and volume voxels can be transformed and depicted in a perspective view through the following steps. First, a source space vertex having (x,y,z) coordinates is converted to a homogeneous coordinate to allow for matrix multiplication as shown below:

$$\begin{bmatrix} x \\ y \\ z \\ w \end{bmatrix} \; w = 1$$

source space vertex

An orthographic model-view matrix is multiplied by a perspective matrix to obtain a combined matrix as shown below:

$$\begin{bmatrix} aM & eM & iM & mM \\ bM & fM & jM & nM \\ cM & gM & kM & oM \\ 0 & 0 & 0 & 1 \end{bmatrix} * \begin{bmatrix} aP & 0 & iP & 0 \\ 0 & fP & jP & 0 \\ 0 & 0 & kP & oP \\ 0 & 0 & -1 & 0 \end{bmatrix} = \begin{bmatrix} a & e & i & m \\ b & f & j & n \\ c & g & k & o \\ d & h & l & p \end{bmatrix}$$

orthographic model-view matrix — perspective matrix — combined matrix

In the perspective matrix, aP=(2\*zNear)/(right−left), fP=(2\*zNear)/(top−bottom), iP=(right+left)/(right−left), jP=(top+bottom)/(top−bottom), kP=(zFar+zNear)/(zFar−zNear), and oP=(2\*zFar\*zNear)/(zFar−zNear). (left, bottom, −zNear) and (right, top, −zNear) specify points on the near clipping plane that are mapped to the lower left and upper right corners of the window, assuming that the eye point of the viewer is located at (0,0,0). The far clipping plane location is specified by −zFar. Both zNear and zFar must be positive.

In order to transform the source space vertex from source space to destination space, the source vertex in matrix form is multiplied by the combined matrix to yield the destination space vertex as shown below:

$$\begin{bmatrix} a & e & i & m \\ b & f & j & n \\ c & g & k & o \\ d & h & l & p \end{bmatrix} * \begin{bmatrix} x \\ y \\ z \\ w \end{bmatrix} = \begin{bmatrix} x' \\ y' \\ z' \\ w' \end{bmatrix}$$

combined matrix — source space vertex — destination space vertex

Performing matrix multiplication, the values for x', y', z', and w' of the vertex point in destination space are derived as shown below:

$$x'=(a*x)+(e*y)+(i*z)+m$$

$$y'=(b*x)+(f*y)+(j*z)+n$$

$$z'=(c*x)+(g*y)+(k*z)+o$$

$$w'=(d*x)+(h*y)+(l*z)+p$$

Next, the vertex point (x',y',z',w') in destination space is divided by the homogeneous coordinate 'w' to modulate the perspective distortion as shown below:

$$x'=X'/w'$$

$$y'=y'/w'$$

$$z'=z'/w'$$

$$w'=w'/w'=1$$

The x' and y' coordinates can now be further adjusted, if desired, for final rendering and sent to the frame buffer.

Two mapping approaches have been utilized for such transformations. A forward mapping approach, which was used in the description above, takes the source vertex and transforms it via a transformation matrix to fit into the destination space. In a backward mapping, or inverse transformation approach, each destination vertex is transformed via an inverse transformation matrix and resampled from the source space. Forward mapping runs the risk of leaving "holes" in the rendering because the source space is sometimes smaller than the destination space. Inverse transformation lends itself to the technique of "ray casting," or stepping in the z-direction, which eliminates the "holes" problem because sample points are taken from the larger destination space back to the smaller source space.

The geometric perspective method of rendering volume data sets in perspective view is very computation intensive and most difficult to do. Because of the typically large size of volume data sets, 3D spatial transformations and perspective renderings are quite taxing on system resources. Optimization of the process is thus a continuing and challenging need in the art. Both hardware and software oriented optimization solutions are beneficial. Current methods of 3D spatial transformation and perspective rendering that utilize floating point numbers are quite expensive, especially when division and often times multiplications are involved. Repetitious calculations for each sample point are also very costly in terms of time to render.

A 3D texture mapping technique supports a limited form of volume rendering that can be modified to yield perspective views. Each successive texture mapped slice of the volume can be adjusted by a 2D scale or zoom operation to reduce the size of the object as you step in the z-direction to obtain perspective. However, this approach is not very accurate.

There is thus a need in the art for a method of 3D spatial transformation and perspective view volume rendering that overcomes the deficiencies of the classic geometric perspective and 3d texture mapping methods by utilizing a ray transform approach that makes fewer compromises in quality or accuracy. There is a need for a perspective view volume rendering method that reduces the number of floating point calculations required to render a perspective view, especially division and multiplication. Also, there is a need in the art to utilize faster integer calculations, such as addition and subtraction, and other simpler CPU instructions, such as shifts and masks. There is a further need in the art to eliminate repetitious calculations from the process. There is also a need in the art to utilize both hardware and software optimization techniques. There is a further need in the art to utilize an inverse transformation approach to perspective view volume rendering to eliminate "holes" in the rendered image. It is therefore apparent that there is a need for an improved method for a fast perspective view volume rendering which meets these and other needs in the art.

This application is related to application Ser. No. 08/866,859 filed May 30, 1997 entitled *Fixed-Point Method for Fast and Precise 3D Spatial Transformations* of Shaz Nagvi, Barthold Lichtenbelt, and Russell Huonder, which is incorporated herein by reference for all that is disclosed and taught therein.

SUMMARY OF THE INVENTION

It is an aspect of the present invention to utilize a ray transformation approach for 3D spatial transformation and perspective view volume rendering.

It is another aspect of the invention to reduce the number of floating point calculations required to render a perspective view by utilizing a 32 bit fixed point format having 16 bits of scalar and 16 bits of fraction, referred to as 16.16 format, rather than a floating point format, for encoding values from a combined inverse matrix and destination image points for 3D spatial transformation and perspective view volume rendering.

Yet another aspect of the invention is to obtain the next sample point along a ray transform by converting z-vector values i, j, and k in 16.16 format to integers and step in the z-direction by performing integer adds.

Still another aspect of the invention is to determine the starting neighborhood locations in source space by shifting the transformed matrix values for (x',y',z') down by 16 bits, yielding the integer value in the source space that represents the starting neighborhood locations.

A further aspect of the invention is to use a masking operation on a transformed matrix value in 16.16 format to utilize the 16 bit fractional component as an index into a precalculated lookup table that contains the fractional floating point value.

A still further aspect of the invention is to take advantage of the larger caches in today's CPU's to process calls to lookup tables and optimize performance.

Another aspect of the invention is to be able to take advantage of both integer and floating point pipelines available in today's CPU's by utilizing a more diverse approach to 3D spatial transformation and perspective view rendering.

The above and other aspects of the invention are accomplished in a ray transform method for 3D spatial transformation and perspective view volume rendering. The method employs the backward mapping, or inverse transformation approach, coupled with ray casting. For the perspective view desired, rays converge at the center of projection, or the eye point, from the projection plane. Each ray is addressed independently, having its own unique transformation matrix, called a ray transform. Each unique ray transform is combined with an orthographic model view matrix to produce a fast, orthographic ray stepping prescription for perspective volume rendering.

First, a beginning destination voxel sample point is determined. Next, the inverse of an orthographic model view matrix is combined with the unique ray transform matrix associated with the beginning destination voxel sample point's (X,Y) pixel location to obtain a combined inverse matrix. Next, the sample point is transformed from destination space to source space by multiplying the destination voxel sample point matrix by the combined inverse matrix.

The transformed sample point values resulting from this matrix multiplication are encoded in a 32 bit fixed point format, consisting of 16 bits of scalar and 16 bits of fraction, called 16.16 format. One skilled in the art will recognize that a 48 bit fixed point format with 24 bits of scalar and 24 bits of fraction, or a 64 bit fixed point format with 32 bits of scalar and 32 bits of fraction, or a mixed combination of the above, such as 8/24, could also be used. The 16.16 format is depicted below:

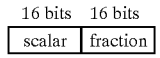

For example, the number 8.9 would be encoded and stored as follows. 8.9 is multiplied by 65,536, less any fractional part, and stored in the 32 bit register. In this example, the "0.9" portion would be encoded as 0.9×65,536=58982 and would appear in the fractional lower portion of the integer number. One skilled in the art will recognize that this ray transform method does not require the use of 16.16 format to encode values. The ray transform method will function with the use of conventional means. The 16.16 format is utilized in the preferred embodiment of the invention.

For each (x',y',z') transformed sample point, either the nearest neighbor or trilinear interpolation resampling techniques may be selected to establish pixel values for rendering. With either technique, the first step is determining the beginning neighborhood voxel point, represented by (i,j,k). This is accomplished by a shift operation on the x', y', and z' transformed sample point values from the combined matrix and initial point calculation. The x', y', and z' transformed sample point values are shifted right 16 bits, which truncates the fraction portion of the 16.16 format. This yields the integer values in the source space that represent the starting neighborhood voxel point.

For the nearest neighbor technique, one way to determine the nearest neighbor voxel point in source space is by rounding the (x',y',z') transformed sample point to integer values. For example, if (8.2, 6.5, 9.6) are transformed sample point values for (x',y',z'), after rounding the values become (8, 7, 10). However, a more efficient way to determine the nearest neighbor voxel is to add 0.5 to each x', y', and z' component, and then truncate the resulting x', y', and z' values. In the above example, 0.5 would be added to the original transformed sample point values of (x',y',z') yielding (8.7, 7.0, 10.1). Truncating each of these values yields (8, 7, 10), just as before. The advantage of this procedures is instead of having to evaluate and compare each sample point along a ray in a rounding operation, the first spatial location in a ray is offset by 0.5. All other points along the ray, since it is a linear relationship, are relative to this first point. Once the 0.5 has been added, the nearest neighbor voxel is determined by simply truncating each of the x', y', and z' values of each successive sample point. This is a more efficient way to handle nearest neighbor determination.

This technique is followed in the preferred embodiment of the invention, where 0.5 is first added to each x', y', and z' transformed sample point component before determining the nearest neighbor source space voxel point. The eight source space voxels that make up the neighborhood surrounding the (x',y',z') transformed sample point are evaluated to obtain the voxel that is nearest to the sample point. The values associated with this nearest neighbor source space voxel are used to determine the pixel value that will be used to render the first (x',y',z') transformed sample point along a ray. Stepping in the z-direction along the ray, the next sample point is determined. This stepping process is accomplished by first converting the z-vector values i, j, and k from the transformed sample point matrix calculation in 16.16 format to integers, and then adding these integer values to the first (x',y',z') transformed sample point of a ray. This process of adding integer values to the current transformed sample point is repeated to obtain the rest of the consecutive transformed sample points along the ray. Then, the beginning destination voxel sample point of the next ray is evaluated as before. In this same fashion, all of the rays for the volume are processed for rendering.

For the trilinear interpolation technique, the eight source voxels constituting the neighborhood in which the (x',y',z') transformed sample point is contained are determined. Next, values for delta x, delta y and delta z, represented by dx, dy, and dz, are calculated. These delta values represent the change in the x, y, and z directions of the transformed sample point within the neighborhood of eight source voxels. These values are derived by obtaining the fractional components of the (x',y',z') transformed sample point by masking the fractional lower portion of the values stored in the 16.16 format and then accessing a fractional lookup table. Anchor values are then calculated for use in pointer arithmetic that helps optimize processing. Finally, a trilinear interpolation method is applied to blend the values from the eight neighborhood source voxels containing the (x',y',z') transformed sample point to obtain a blended value to be applied in rendering the first transformed sample point along a ray. Stepping in the z-direction along the ray, the next transformed sample point is evaluated according to the same method described above utilizing integer adds and applying the trilinear interpolation method. This process is repeated for the rest of the sample points along the ray. Then, the beginning destination voxel sample point of the next ray is determined as before. The integer adds are utilized for the rest of the transformed sample points along this second ray and applying trilinear interpolation to obtain values for rendering. In this same fashion, all of the rays for the volume are processed for rendering.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
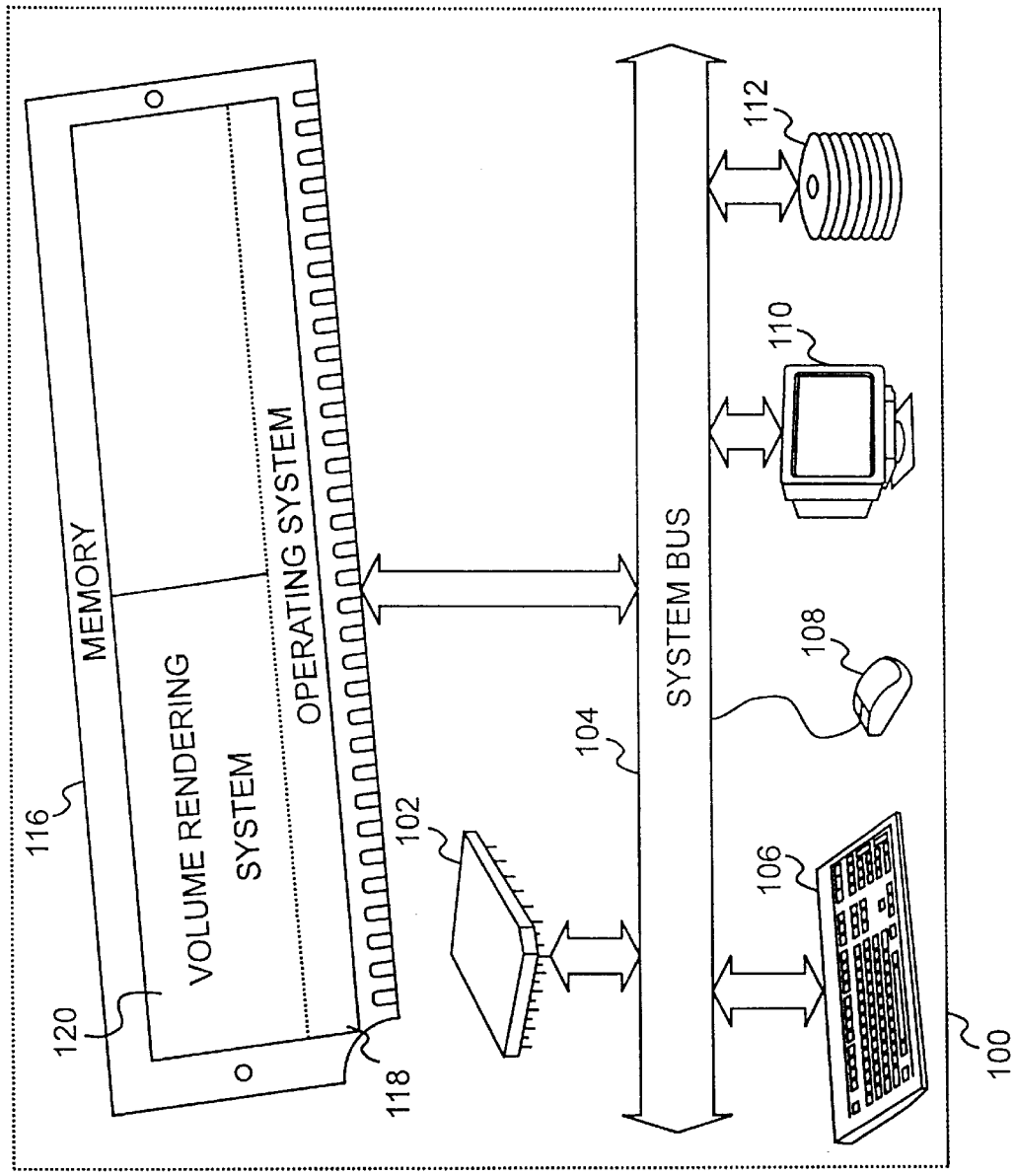
FIG. 1 shows a block diagram of a computer system having a volume rendering system incorporating the present invention.

FIG. 1 shows a block diagram of a computer system containing a volume rendering system incorporating the present invention. Referring now to FIG. 1, a computer system 100 contains a processing element 102. Processing element 102 communicates to other elements of computer system 100 over a system bus 104. A keyboard 106 allows a user to input information into computer system 100 and a graphics display 110 allows computer system 100 to output information to the user. A mouse 108 is also used to input information and a storage device 112 is used to store data and programs within computer system 100. A memory 116, also attached to system bus 104, contains an operating system 118, and a volume rendering system 120 of the present invention.

Figure 2:
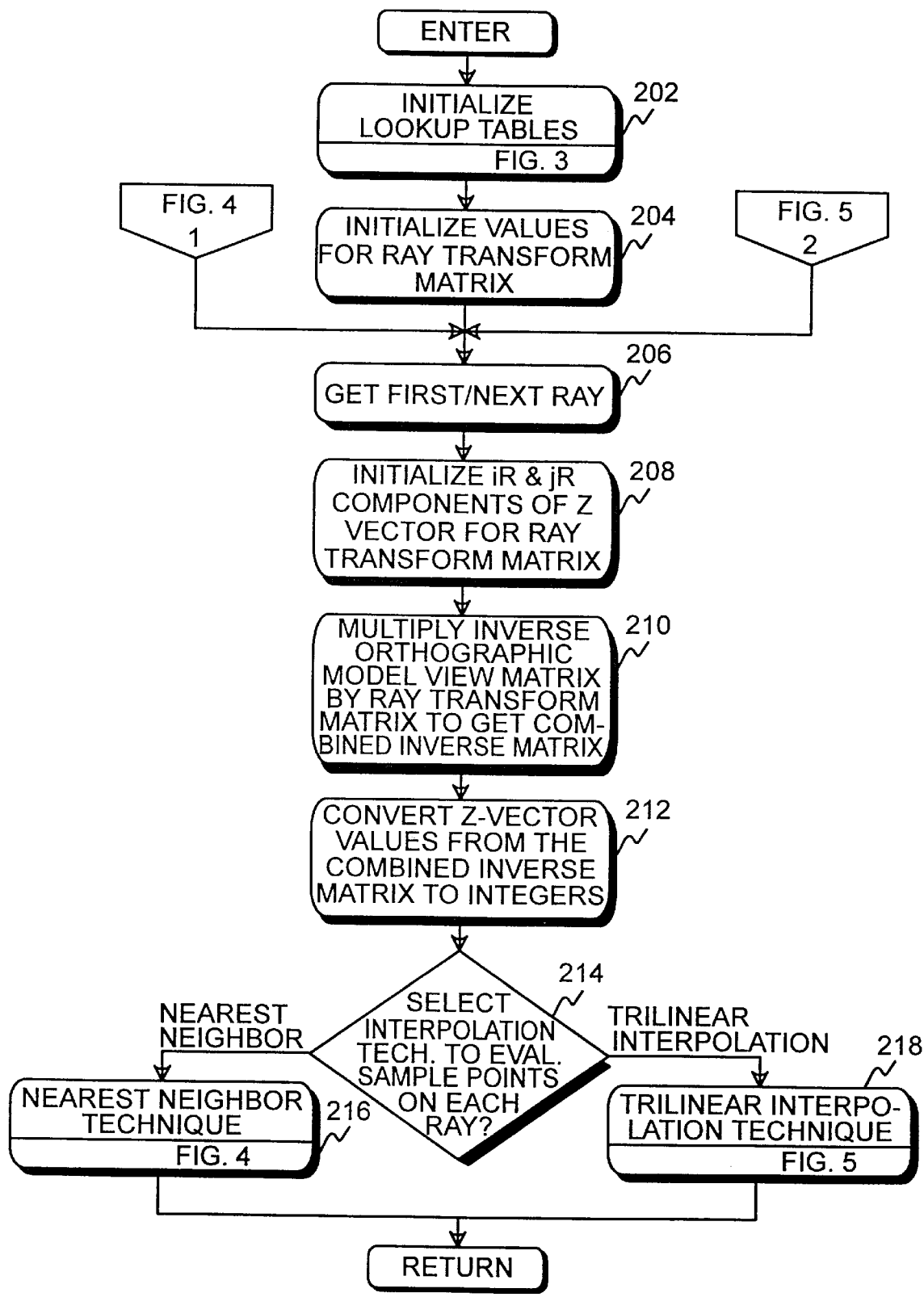
FIG. 2 shows a block diagram of a ray transform method for a fast perspective view volume rendering of the present invention.

FIG. 2 shows a block diagram of the ray transform method for a fast perspective view volume rendering of the present invention. Referring now to FIG. 2, after entry, block 202 calls FIG. 3 which initializes the lookup tables that are utilized by the invention. Block 204 initializes values that are used in the ray transform matrix of the present invention as shown below:

$$\begin{bmatrix} aR & eR & iR & mR \\ bR & fR & jR & nR \\ cR & gR & kR & oR \\ dR & hR & lR & pR \end{bmatrix}_{\text{uninitialized ray transform}} = \begin{bmatrix} 1 & 0 & iR & 0 \\ 0 & 1 & jR & 0 \\ 0 & 0 & 1 & 0 \\ 0 & 0 & 0 & 1 \end{bmatrix}_{\text{initialized ray transform}}$$

Block 206 gets the first ray to be evaluated from a beginning destination pixel location (X,Y). Block 208 initializes the iR and jR components of the z-vector of the ray transform matrix for this particular 'X' and 'Y' ray where 'distance' describes the near projection plane from the center of projection, or eye point of the viewer, as shown below:

iR=X/distance jR=Y/distance

Block 210 then multiplies the inverse orthographic model view matrix by the ray transform matrix to yield a combined inverse matrix as shown below:

$$\begin{bmatrix} aM & eM & iM & mM \\ bM & fM & jM & nM \\ cM & gM & kM & oM \\ 0 & 0 & 0 & 1 \end{bmatrix}_{\text{inverse orthographic model view matrix}} * \begin{bmatrix} 1 & 0 & iR & 0 \\ 0 & 1 & jR & 0 \\ 0 & 0 & 1 & 0 \\ 0 & 0 & 0 & 1 \end{bmatrix}_{\text{ray transform matrix}} = \begin{bmatrix} aC & eC & iC & mC \\ bC & fC & jC & nC \\ cC & gC & kC & oC \\ 0 & 0 & 0 & 1 \end{bmatrix}_{\text{combined inverse matrix}}$$

Block 212 then converts the z-vector values from the combined inverse matrix to integers. This is accomplished by multiplying the three z-vector components, iC, jC, and kC in floating point format by 65536, which converts the values to 16.16 format. These values will be used later to step in the z-direction by doing integer adds.

In block 214 the user selects which interpolation technique is to be used in determining pixel values. If the user selects the nearest neighbor technique, then control passes to block 216 which calls FIG. 4 to perform the nearest neighbor interpolation technique. If the interpolation technique selected in block 214 is trilinear interpolation, then control passes to block 218, which calls FIG. 5 to perform the trilinear interpolation technique. After control is returned from either FIG. 4 or FIG. 5, control returns to volume rendering system 120 (FIG. 1).

Figure 3:
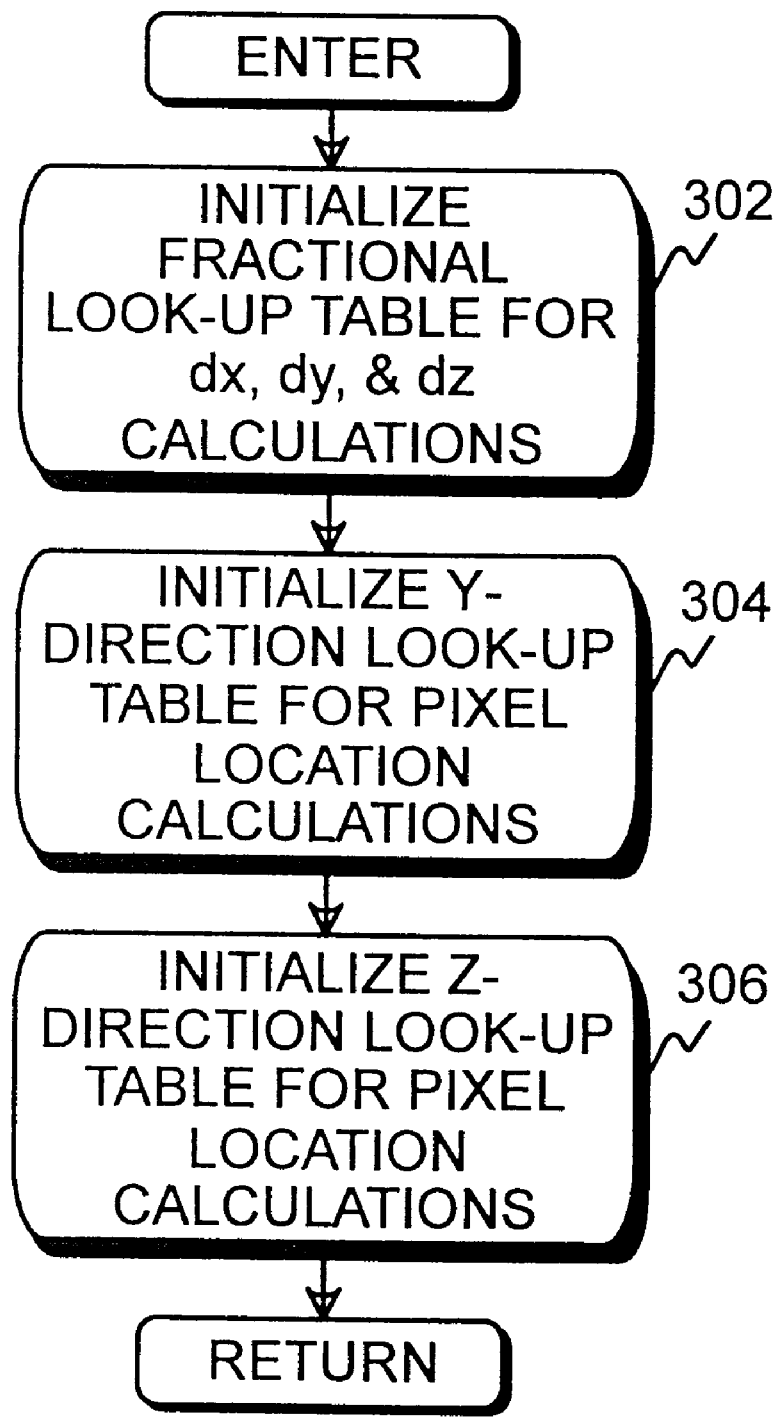
FIG. 3 shows a block diagram of lookup table initialization.

FIG. 3 shows a block diagram of lookup table initialization. Referring now to FIG. 3, block 302 initializes a fractional lookup table to be utilized in calculating dx, dy, and dz values by volume rendering system 120 (FIG. 1). The table is derived from the following programming code in the "c" programming language:

for(i=0; i<65536; i++) fixedPointLUT[i]=(float)i/65536.0;

For example, for i=1, the value stored in the fractional lookup table would be 1/65,536=0.0000. For i=32,768, the value stored in the fractional lookup table would be 32,768/65,536=0.5000. For i=65,535, the value stored in the fractional lookup table would be 65,535/65,536=0.9999.

Block 304 initializes a y-direction lookup table to be utilized in pixel location calculations. The table is derived from the following programming code in the "c" programming language:

for(i=0; i<HEIGHT; i++) yStrideLUT[i]=i * WIDTH;

For example, if a volume data set was 256 voxels wide by 128 voxels high by 64 voxels deep, for i=1, the value stored in the y-direction lookup table would be 1 * 256=256. For i=64, the value stored would be 64 * 256=16384. For i=127, the value stored would be 127 * 256=32512.

Block 306 initializes a z-direction lookup table to be utilized in pixel location calculations. The table is derived from the following programming code in the "c" programming language:

for(i=0; i<DEPTH; i++) zStrideLUT[i]=i * WIDTH * HEIGHT;

For example, if a volume data set was 256 voxels wide by 128 voxels high by 64 voxels deep, for i=1, the value stored in the Z-direction lookup table would be 1 * 256 * 128= 32768. For i=32, the value stored would be 32 * 256 * 128=1048576. For i=65, the value stored would be 65 * 256 * 128=2129920. After initialization is complete, FIG. 3 then returns to FIG. 2.

Figure 4:
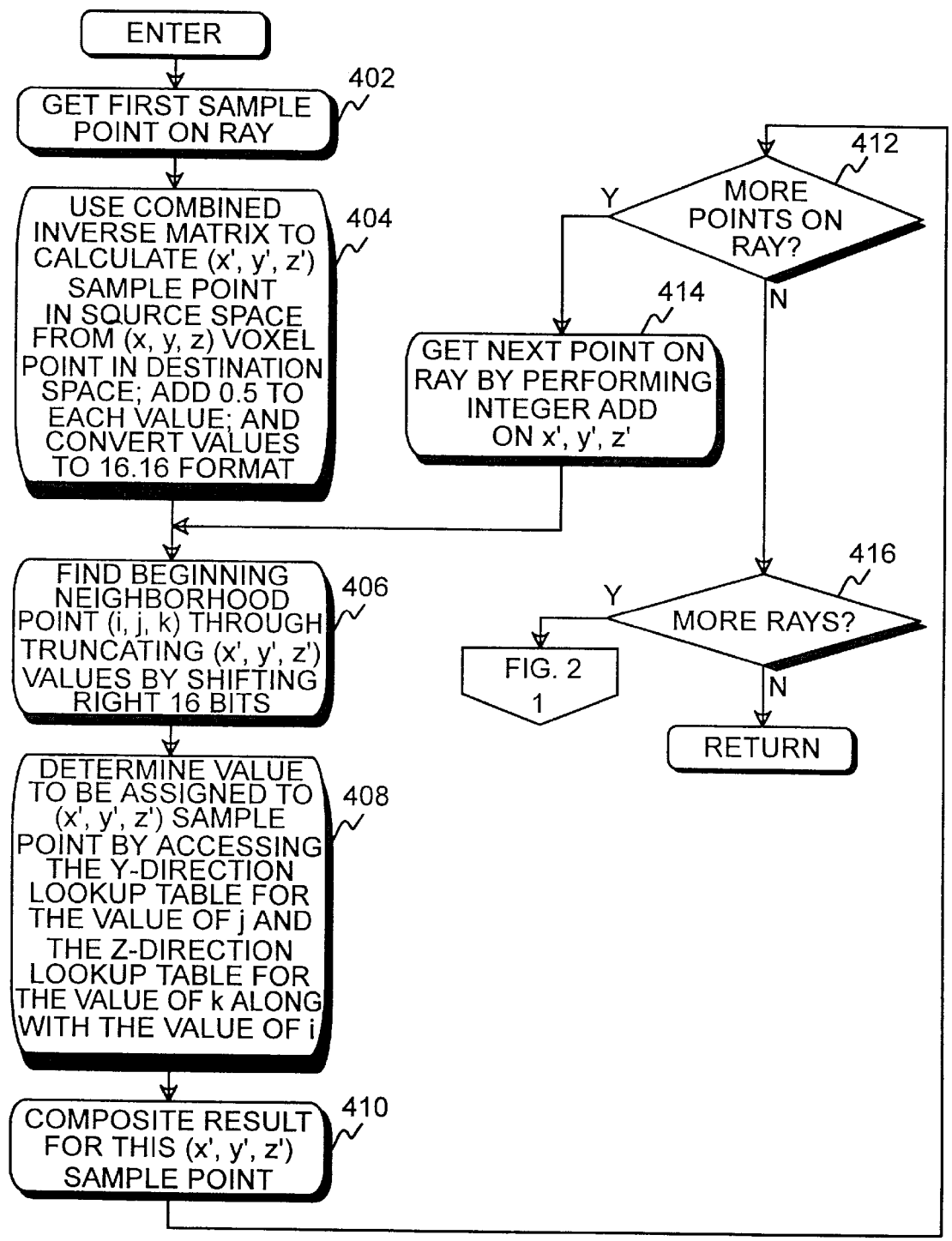
FIG. 4 shows a block diagram of the nearest neighbor interpolation technique.

FIG. 4 shows a block diagram of the nearest neighbor interpolation technique. Referring now to FIG. 4, block 402 gets the first sample point along the first ray selected in block 206 (FIG. 2). Block 404 uses the combined inverse matrix determined in block 210 (FIG. 2) to calculate a first (x',y',z') transformed sample point of a ray in the source space from an (x,y,z) voxel point in the destination space by performing matrix multiplication as shown below:

$$\underbrace{\begin{bmatrix} aC & eC & iC & mC \\ bC & fC & jC & nC \\ cC & gC & kC & oC \\ 0 & 0 & 0 & 1 \end{bmatrix}}_{\text{combined inverse matrix}} * \underbrace{\begin{bmatrix} x \\ y \\ z \\ 1 \end{bmatrix}}_{\text{destination voxel point}} = \underbrace{\begin{bmatrix} x' \\ y' \\ z' \\ 1 \end{bmatrix}}_{\text{transformed sample point}}$$

0.5 is added to each x', y', and z' component. Each component is also converted to the 16.16 format by multiplying by 65,536.

In block 406 the beginning neighborhood point (i,j,k) in source space is determined through truncating the fractional portion of the x', y', and z' transformed sample point values. This is accomplished by shifting the 16.16 format value right 16 bits.

Block 408 determines the value to be used in rendering the transformed sample point. This is accomplished by accessing the y-direction lookup table for the value of j, the z-direction look up table for the value of k, and using the computed value of i for the x component, and a pointer to the source volume data set, according to the following programming code in the "c" programming language:

*result=srcVolume[zStrideLUT[k]+yStrideLUT[j]+i];*

"Result" is the value of the nearest source space voxel that will be used in rendering the transformed sample point. Block 410 performs a compositing process on the result obtained for this transformed sample point to determine the pixel values that will be used to render that (X,Y) pixel location corresponding to this sample point. One skilled in the art will recognize that compositing may be performed after all the sample points on a ray have been evaluated as opposed to compositing each sample point as each sample point is processed.

Block 412 determines whether there are more sample points along the ray to be evaluated. If yes, block 414 gets the next sample point along the ray to be evaluated. Stepping from sample point to sample point along the ray is accomplished by simple integer adds using the values determined in block 212 (FIG. 2) and the x', y', and z' values. Control then passes to block 406. The steps in blocks 406, 408, and 410 are then repeated. If the answer in block 412 is no, indicating that there are no more sample points along the current ray, then control passes to block 416 which determines if there are more rays to be processed. If the answer in block 416 is yes, then control returns to block 206 in FIG. 2 to get the next ray. If the answer in block 416 is no, indicating that there are no more rays to be processed, then FIG. 4 returns to FIG. 2.

Figure 5:
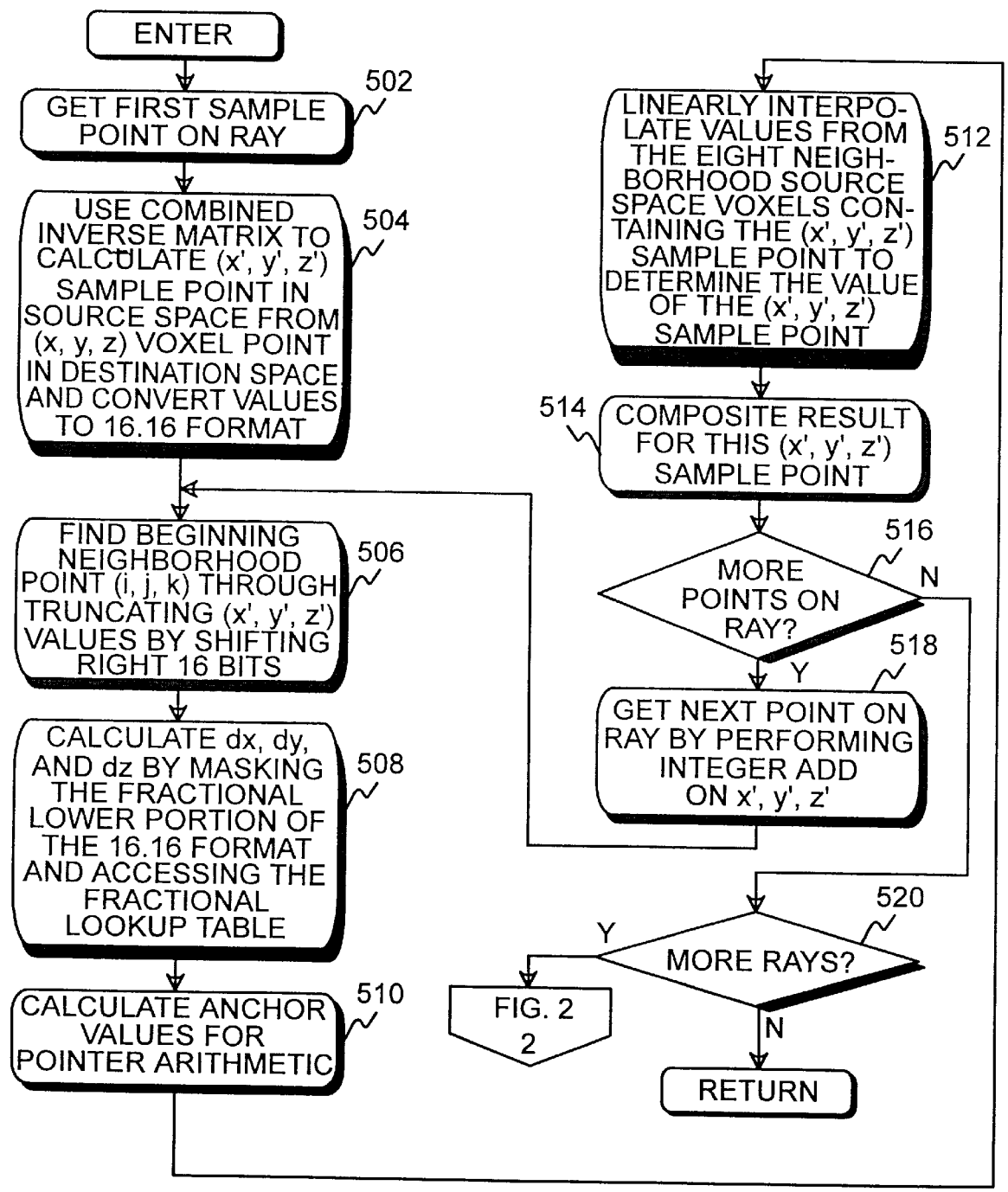
FIG. 5 shows a block diagram of the trilinear interpolation technique.

FIG. 5 shows a block diagram of the trilinear interpolation technique. Referring now to FIG. 5, block 502 gets the first sample point along the first ray selected in block 206 (FIG. 2). Block 504 uses the combined inverse matrix determined in block 210 (FIG. 2) to calculate a first (x',y',z') transformed sample point of a ray in the source space from an (x,y,z) voxel point in the destination space by performing matrix multiplication as shown below:

$$\underbrace{\begin{bmatrix} aC & eC & iC & mC \\ bC & fC & jC & nC \\ cC & gC & kC & oC \\ 0 & 0 & 0 & 1 \end{bmatrix}}_{\text{combined inverse matrix}} * \underbrace{\begin{bmatrix} x \\ y \\ z \\ 1 \end{bmatrix}}_{\text{destination voxel point}} = \underbrace{\begin{bmatrix} x' \\ y' \\ z' \\ 1 \end{bmatrix}}_{\text{transformed sample point}}$$

Each component is also converted to the 16.16 format by multiplying by 65,536.

In block 506 the beginning neighborhood point (i,j,k) in source space is determined through truncating the fractional portion of the x', y', and z' transformed sample point values. This is accomplished by shifting the 16.16 format value right 16 bits.

Block 508 calculates the values of dx, dy, and dz, which are delta values representing the change in the x, y, and z directions of the transformed sample point within the surrounding neighborhood of eight source voxels. These values are calculated by masking the fractional lower portion of the 16.16 format value with an 'and' operation and then accessing the fractional lookup table according to the following:

dx=fixedPointLUT[x'& 0xffff];

dy=fixedPointLUT[y'& 0xffff];

dz=fixedPointLUT[z'& 0xffff];

Block 510 calculates anchor values that point to data in the original volume data set. These anchor values are used in pointer arithmetic to optimize calculations and also allow for easier compiling.

Figure 9:
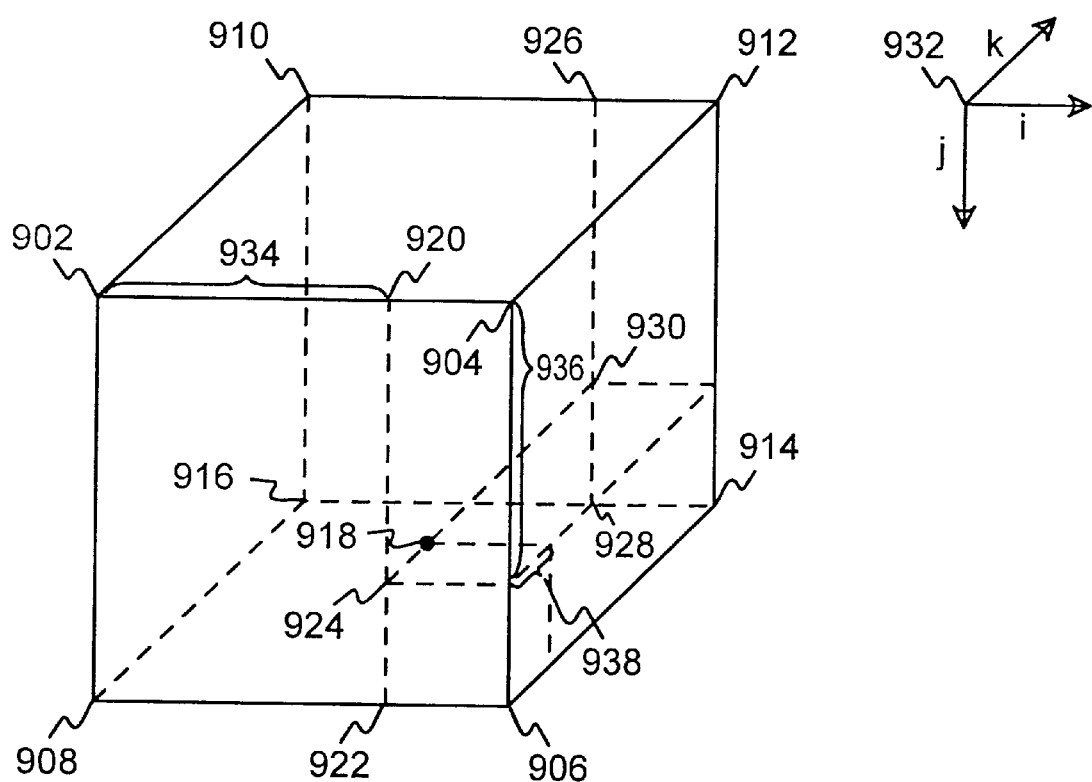
FIG. 9 shows a 3D representation of the trilinear interpolation technique for determining pixel values for rendering sample points after a 3D spatial transformation.

Block 512 applies the method of trilinear interpolation of FIG. 9. Values from the eight neighborhood source space voxels containing the (x',y',z') transformed sample point are trilinearly interpolated to derive a blended source value that will be used to render the (X,Y) pixel corresponding to the (x',y',z') transformed sample point for the ray.

Block 514 performs a compositing process on the result obtained for this transformed sample point to determine the pixel values that will be used to render that (X,Y) pixel location corresponding to this sample point. One skilled in the art will recognize that compositing may be performed after all the sample points on a ray have been evaluated as opposed to compositing each sample point as each sample point is processed.

Block 516 determines whether there are more sample points along the ray to be evaluated. If yes, block 518 gets the next sample point along the ray to be evaluated. Stepping from sample point to sample point along the ray is accomplished by simple integer adds using the values determined in block 212 (FIG. 2) and the x', y', and z' values. Control then passes to block 506. The steps in blocks 506, 508, 510, 512, and 514 are then repeated. If the answer in block 516 is no, indicating that there are no more sample points along the current ray, then control passes to block 520 which determines if there are more rays to be processed. If the answer in block 520 is yes, then control returns to block 206 in FIG. 2 to get the next ray. If the answer in block 520 is no, indicating that there are no more rays to be processed, then FIG. 5 returns to FIG. 2.

Figure 6:
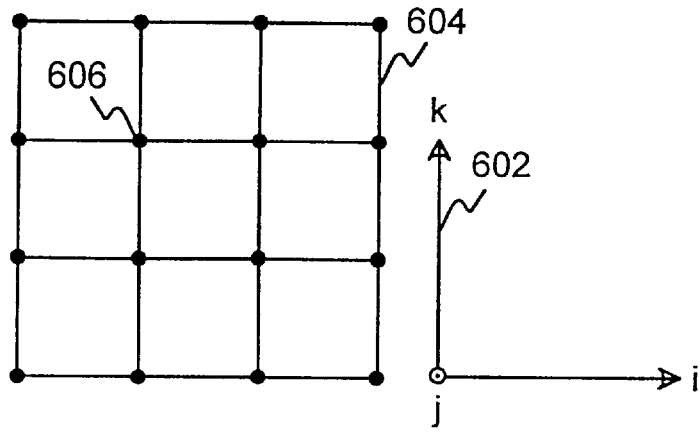
FIG. 6 shows a 2D representation of a volume data set in source space.

FIG. 6 shows a 2D representation of a volume data set in source space. Referring now to FIG. 6, a simplified 2D representation of a volume data set in source space is used to illustrate the combined inverse matrix transformation relationship between voxels and sample points. Key 602 represents the i, j, and k directions in source space with the j direction extending perpendicularly out from the plane of the paper. Volume data set 604 in source space has voxels located at the intersections of the grid lines. Voxel 606 is typical of all the voxels in volume data set 604.

Figure 7:
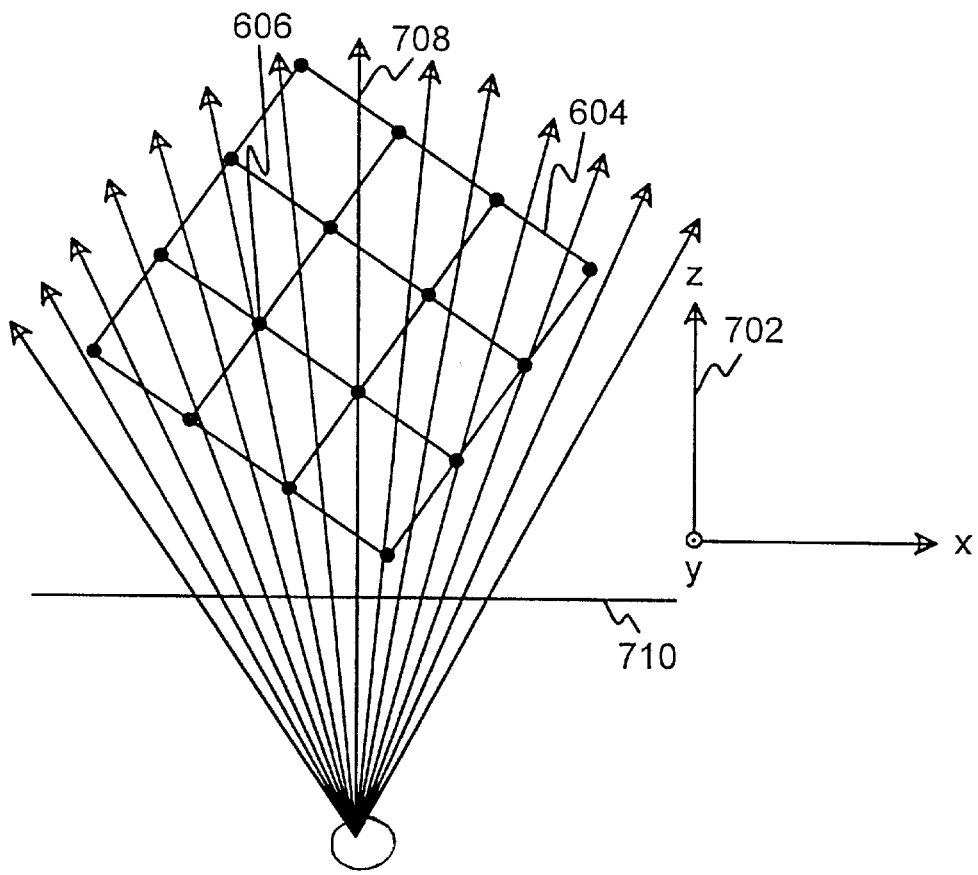
FIG. 7 shows a 2D representation of the volume data set of FIG. 6 in destination space after transformation for a perspective view.

FIG. 7 shows a 2D representation of the volume data set of FIG. 6 in destination, or view space, after transformation for a perspective rendering. Referring now to FIG. 7, a combined matrix operator has been applied to volume data set 604 (FIG. 6) resulting in the change of orientation shown for volume data set 604 in destination, or view space for a perspective rendering. Key 702 represents the x, y, and z directions in destination, or view space, with the y direction extending perpendicularly out from the plane of the paper. As a result of the combined matrix operator, for the perspective view desired by the user, center of projection 704 is established. View vector 708 is typical of the many view vectors emanating from center of projection 704. Image plane 710 extends perpendicularly out from the plane of the paper and is established at a certain distance away form center of projection 704.

Figure 8:
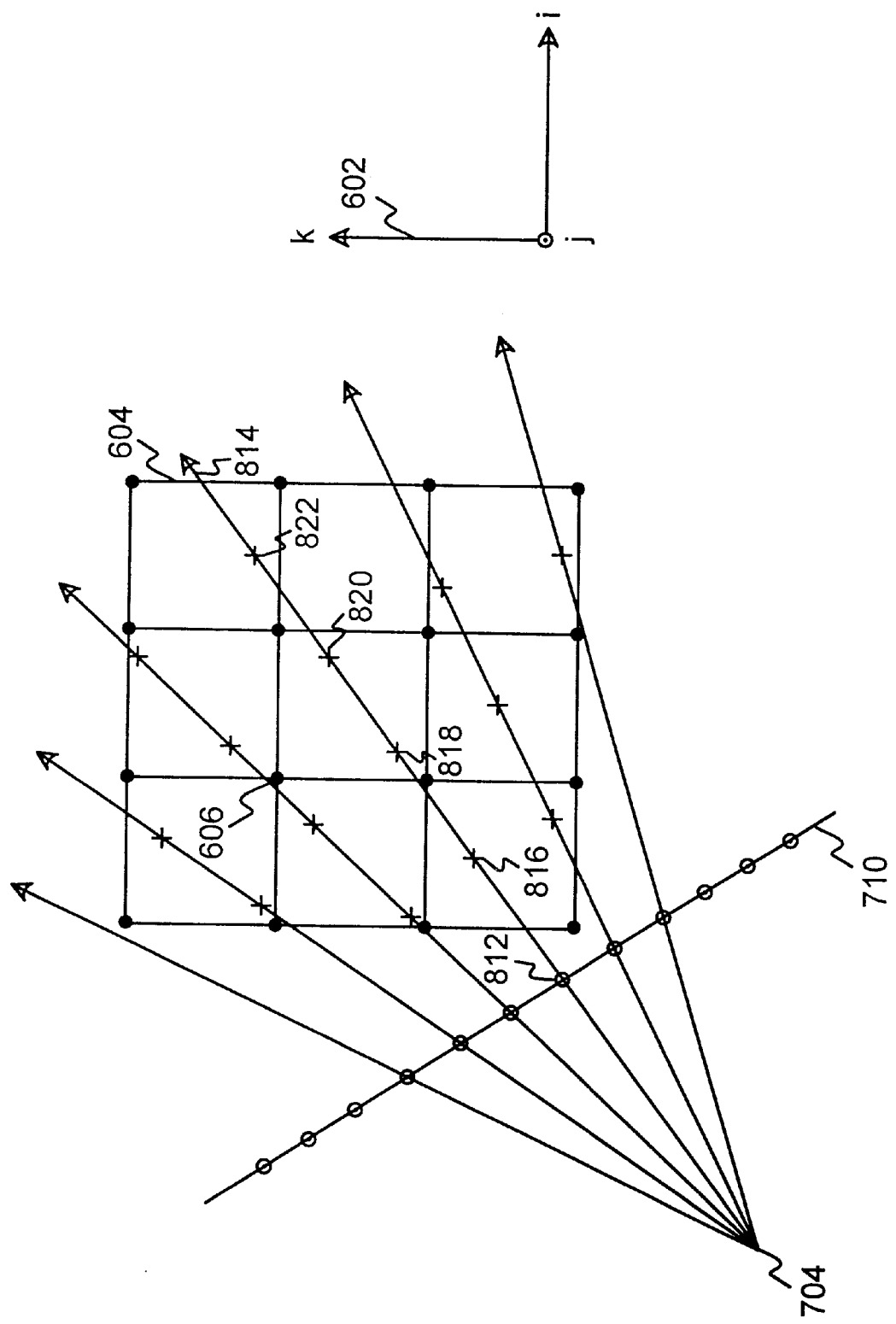
FIG. 8 shows a 2D representation of the volume data set of FIG. 7 back in source space after transformation by the inverse combined matrix.

FIG. 8 shows a 2D representation of the volume data set of FIG. 7 back in source space after transformation by the combined inverse matrix. Referring now to FIG. 8, a combined inverse matrix operator has been applied to volume data set 604. Key 602 represents the i, j, and k directions in source space with the k direction extending perpendicularly out from the plane of the paper. Image plane 710 (FIG. 7) has also been brought into source space preserving the relationship it had with volume data set 604 in destination, or view space. Rays are cast from center of projection 704 through pixel locations along image plane 710. Pixel 812 and ray 814 are typical of the pixels along image plane 710 and the rays cast from them emanating from center of projection 704.

Located along ray 814 are sample points 816, 818, 820, and 822 that fall within volume data set 604. An interpolation technique of some kind must be applied to derive values for sample points 816, 818, 820, and 822 from the neighborhood voxels surrounding each sample point. Nearest neighbor and trilinear interpolation are two such techniques that apply to 3D spatial transformations. Sample points along other rays are similarly processed. One skilled in the art will recognize that the principles illustrated in FIGS. 6 through 8 in a 2D depiction apply as well in three dimensions.

FIG. 9 shows a 3D representation of the trilinear interpolation technique for determining pixel values for rendering sample points after a 3D spatial transformation. Referring now to FIG. 9, key 932 represents the i, j, and k directions in source space. Transformation sample point 918 is an (x',y',z') sample point in source space. 902, 904, 906, 908, 910, 912, 914, and 916 represent eight voxels in source space containing (x',y',z') transformed sample point 918. The dx distance 934 is determined by masking the fractional lower portion of the x' 16.16 format value and accessing the fractional lookup table 302 (FIG. 3). The dy distance 936 is determined by masking the fractional lower portion of the y' 16.16 format value and accessing the fractional lookup table 302 (FIG. 3). The dz distance 938 is determined by masking the fractional lower portion of the z' 16.16 format value and accessing the fractional lookup table 302 (FIG. 3).

Interpolation begins by evaluating a first slice, defined by the plane containing the points 902, 904, 906, and 908. The value of point 920 is interpolated by taking the difference between voxels 904 and 902, multiplying by the value of dx distance 934, and then adding this product to the value of voxel 902, represented by the following formula, where P920, P904, etc., represent the value of each point at that location:

P920=((P904−P902) * dx)+P902

Likewise, the value of point 922 is determined by taking the difference between voxels 906 and 908, multiplying by the value of dx distance 934, and then adding this product to the value of voxel 908.

In a similar fashion, the value of point 924 is determined by taking the difference between points 922 and 920, multiplying by the value of dy distance 936, and then adding this product to the value of point 920.

The same procedure above is followed for the next slice, defined by the plane containing voxels 910, 912, 914, and 916. The values of points 926, 928 and 930 are determined in the same fashion as points 920, 922, and 924 indicated above.

The final value that will be used to render the pixel corresponding to transformed sample point 918 is determined by taking the difference between points 930 and 924, multiplying by the value of dz distance 938, and then adding this product to the value of point 924. This process is repeated for each sample point along a ray, and for all rays in the volume to be rendered.

Having described a presently preferred embodiment of the present invention, it will be understood by those skilled in the art that many changes in construction and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A ray transform method for a fast perspective view volume rendering of a volume data set for rendering said volume data set on a 2D graphics display of a computer system, said method comprising the steps of:

(a) expressing at least one destination voxel of a ray as a homogeneous coordinate having an x value, a y value, a z value, and a w value;

(b) determining a distance value for a projection plane for a desired perspective view;

(c) generating a ray transform matrix associated with a pixel location, said pixel location having an X component and a Y component, and said x value and said y value of said at least one destination voxel of said ray expressed as said homogeneous coordinate, said ray transform matrix further comprising a z-vector wherein said z-vector has an iR component and a jR component;

(d) initializing all values for said ray transform matrix except for said iR component and said jR component;

(e) initializing said iR component and said jR component of said z-vector of said ray transform matrix by dividing said X component of said pixel location by said distance value for said iR component and dividing said Y component of said pixel value by said distance value for said jR component;

(f) generating an inverse orthographic model-view matrix, said inverse orthographic model-view matrix having homogeneous coordinates;

(g) multiplying said inverse orthographic model-view matrix by said ray transform matrix yielding a combined inverse matrix;

(h) multiplying said at least one destination voxel expressed as said homogeneous coordinate by said combined inverse matrix, yielding an inverse transformed sample point, said inverse transformed sample point having an x' coordinate value, a y' coordinate value, and a z' coordinate value;

(i) adding 0.5 to each of said x' coordinate value, said y' coordinate value, and said z' coordinate value of said inverse transformed sample point;

(j) determining a beginning neighborhood point;

(k) determining a neighborhood of eight source voxels surrounding said beginning neighborhood point;

(l) determining a nearest neighborhood source voxel from said neighborhood of eight source voxels in relation to said beginning neighborhood point, said nearest neighborhood source voxel having a source value; and (m) assigning said source value of said nearest neighbor source voxel to said inverse transformed sample point, wherein said source value is used in the further rendering process for said inverse transformed sample point.

2. The method of claim 1 wherein step (j) further comprises the following steps (j1) and (j2):

(j1) encoding said x' coordinate value, said y' coordinate value, and said z' coordinate value of said inverse transformed sample point into a fixed point format, said fixed point format having a scalar portion having a first predetermined number of bits and a fraction portion having a second predetermined number of bits; and (j2) shifting each of said x' coordinate value, said y' coordinate value, and said z' coordinate value of said inverse transformed sample point said predetermined number of bits to the right, yielding said beginning neighborhood point, said beginning neighborhood point having an integer component i, an integer component j, and an integer component k.

3. The method of claim 2 wherein said first predetermined number of bits and said second predetermined number of bits is 16.

4. The method of claim 1 further comprising the following step (a1) performed before step (a):

(a1) creating a y-direction lookup table and a z-direction lookup table.

5. The method of claim 4 wherein step (l) further comprises the following step (l1):

(l1) determining said nearest neighbor source voxel by accessing said y-direction lookup table and said z-direction lookup table.

6. A ray transform method for a fast perspective view volume rendering of a volume data set for rendering said volume data set on a 2D graphics display of a computer system, said method comprising the steps of:

(a) expressing at least one destination voxel of a ray as a homogeneous coordinate having an x value, a y value, a z value, and a w value;

(b) determining a distance value for a projection plane for a desired perspective view;

(c) generating a ray transform matrix associated with a pixel location, said pixel location having an X component and a Y component, and said x value and said y value of said at least one destination voxel of said ray expressed as said homogeneous coordinate, said ray transform matrix further comprising a z-vector wherein said z-vector has an iR component and a jR component;

(d) initializing all values for said ray transform matrix except for said iR component and said jR component;

(e) initializing said iR component and said jR component of said z-vector of said ray transform matrix by dividing said X component of said pixel location by said distance value for said iR component and dividing said Y component of said pixel value by said distance value for said jR component;

(f) generating an inverse orthographic model-view matrix, said inverse orthographic model-view matrix having homogeneous coordinates;

(g) multiplying said inverse orthographic model-view matrix by said ray transform matrix yielding a combined inverse matrix;

(h) multiplying said at least one destination voxel expressed as said homogeneous coordinate by said combined inverse matrix, yielding an inverse transformed sample point, said inverse transformed sample point having an x' coordinate value, a y' coordinate value, and a z' coordinate value;

(i) determining a beginning neighborhood point;

(j) determining a neighborhood of eight source voxels surrounding said beginning neighborhood point, wherein each of said neighborhood of eight source voxels has a source value;

(k) determining a delta x value;

(l) determining a delta y value;

(m) determining a delta z value; and (n) determining a blended source value for said inverse transformed sample point through trilinear interpolation of said source values of said neighborhood of eight source voxels, said delta x value, said delta y value, and said delta z value, wherein said blended source value for said inverse transformed sample point is used in the further rendering process for said inverse transformed sample point.

7. The method of claim 6 wherein step (i) further comprises the following steps (i1) and (i2):

(i1) encoding said x' coordinate value, said y' coordinate value, and said z' coordinate value of said inverse transformed sample point into a fixed point format, said fixed point format having a scalar portion having a first predetermined number of bits and a fraction portion having a second predetermined number of bits; and (i2) shifting each of said x' coordinate value, said y' coordinate value, and said z' coordinate value of said inverse transformed sample point said predetermined number of bits to the right, yielding said beginning neighborhood point, said beginning neighborhood point having an integer component i, an integer component j, and an integer component k.

8. The method of claim 7 wherein said first predetermined number of bits and said second predetermined number of bits is 16.

9. The method of claim 6 further comprising the following step (a1) performed before step (a):

(a1) creating a fractional lookup table, a y-direction lookup table, and a z-direction lookup table.

10. The method of claim 9 wherein steps (k), (l), (m), and (n) further comprise the following steps (k1), (l1), (m1), and (n1):

(k1) determining said delta x value by masking said x' coordinate value of said inverse transformed sample point and accessing said fractional lookup table;

(l1) determining said delta y value by masking said y' coordinate value of said inverse transformed sample point and accessing said fractional lookup table;

(m1) determining said delta z value by masking said z' coordinate value of said inverse transformed sample point and accessing said fractional lookup table; and (n1) determining said blended source value by accessing said y-direction lookup table and said z-direction lookup table to aid trilinear interpolation.

11. A ray transform method for a fast perspective view volume rendering of a volume data set for rendering said volume data set on a 2D graphics display of a computer system, said method comprising the steps of:

(a) expressing a beginning destination voxel of a ray as a homogeneous coordinate having an x value, a y value, a z value, and a w value;

(b) determining a distance value for a projection plane for a desired perspective view;

(c) generating a ray transform matrix associated with a pixel location, said pixel location having an X component and a Y component, and said x value and said y value of said beginning destination voxel of said ray expressed as said homogeneous coordinate, said ray transform matrix further comprising a z-vector wherein said z-vector has an iR component and a jR component;

(d) initializing all values for said ray transform matrix except for said iR component and said jR component;

(e) initializing said iR component and said jR component of said z-vector of said ray transform matrix by dividing said X component of said pixel location by said distance value for said iR component and dividing said Y component of said pixel value by said distance value for said jR component;

(f) generating an inverse orthographic model-view matrix, said inverse orthographic model-view matrix having homogeneous coordinates;

(g) multiplying said inverse orthographic model-view matrix by said ray transform matrix yielding a combined inverse matrix;

(h) isolating a z-vector component of said combined inverse matrix, said z-vector component having an iC value, a jC value, and a kC value;

(i) multiplying said beginning destination voxel of said ray expressed as said homogeneous coordinate by said combined inverse matrix, yielding an inverse transformed sample point, said inverse transformed sample point having an x' coordinate value, a y' coordinate value, and a z' coordinate value;

(j) adding 0.5 to each of said x' coordinate value, said y' coordinate value, and said z' coordinate value of said inverse transformed sample point;

(k) determining a beginning neighborhood point;

(l) determining a neighborhood of eight source voxels surrounding said beginning neighborhood point;

(m) determining a nearest neighborhood source voxel from said neighborhood of eight source voxels in relation to said beginning neighborhood point, said nearest neighborhood source voxel having a source value;

(n) assigning said source value of said nearest neighbor source voxel to said inverse transformed sample point, wherein said source value is used in the further rendering process for said inverse transformed sample point;

(o) deriving a next transformed sample point along said ray by adding said iC value to said x' coordinate value, adding said jC value to said y' coordinate value, and adding said kC value to said z' coordinate value;

(p) repeating steps (l) through (n) for said next transformed sample point; and (q) repeating steps (o) and (p) until all of said next transformed sample points along said ray have been processed.

12. The method of claim 11 wherein step (h) further comprises converting said z-vector component of said combined inverse matrix to integer values by multiplying each of said iC value, said jC value, and said kC value by 65536, yielding an iF value, a jF value, and a kF value.

13. The method of claim 12 wherein step (o) is replaced with the following new step (o):

(o) deriving a next transformed sample point along said ray by adding said iF value to said x' coordinate value, adding said jF value to said y' coordinate value, and adding said kF value to said z' coordinate value.

14. The method of claim 11 wherein step (k) further comprises the following steps (k1) and (k2):

(k1) encoding said x' coordinate value, said y' coordinate value, and said z' coordinate value of said inverse transformed sample point into a fixed point format, said fixed point format having a scalar portion having a first predetermined number of bits and a fraction portion having a second predetermined number of bits; and (k2) shifting each of said x' coordinate value, said y' coordinate value, and said z' coordinate value of said inverse transformed sample point said predetermined number of bits to the right, yielding said beginning neighborhood point, said beginning neighborhood point having an integer component i, an integer component j, and an integer component k.

15. The method of claim 14 wherein said first predetermined number of bits and said second predetermined number of bits is 16.

16. The method of claim 11 further comprising the following step (a1) performed before step (a):

(a1) creating a y-direction lookup table and a z-direction lookup table.

17. The method of claim 11 wherein step (m) further comprises the following step (m1):

(m1) determining said nearest neighbor source voxel by accessing said y-direction lookup table and said z-direction lookup table.

18. The method of claim 11 wherein step (n) further comprises the following step (n1):

(n1) compositing said source value assigned to said inverse transformed sample point.

19. The method of claim 11 further comprising the step of:

(r) getting a next beginning destination voxel of a next ray and repeating steps (a) through (q) until all said next rays have been processed.

20. A ray transform method for a fast perspective view volume rendering of a volume data set for rendering said volume data set on a 2D graphics display of a computer system, said method comprising the steps of:

(a) expressing a beginning destination voxel of a ray as a homogeneous coordinate having an x value, a y value, a z value, and a w value;

(b) determining a distance value for a projection plane for a desired perspective view;

(c) generating a ray transform matrix associated with a pixel location, said pixel location having an X component and a Y component, and said x value and said y value of said beginning destination voxel of said ray expressed as said homogeneous coordinate, said ray transform matrix further comprising a z-vector wherein said z-vector has an iR component and a jR component;

(d) initializing all values for said ray transform matrix except for said iR component and said jR component;

(e) initializing said iR component and said jR component of said z-vector of said ray transform matrix by dividing said X component of said pixel location by said distance value for said iR component and dividing said Y component of said pixel value by said distance value for said jR component;

(f) generating an inverse orthographic model-view matrix, said inverse orthographic model-view matrix having homogeneous coordinates;

(g) multiplying said inverse orthographic model-view matrix by said ray transform matrix yielding a combined inverse matrix;

(h) isolating a z-vector component of said combined inverse matrix, said z-vector component having an iC value, a jC value, and a kC value;

(i) multiplying said beginning destination voxel of said ray expressed as said homogeneous coordinate by said combined inverse matrix, yielding an inverse transformed sample point, said inverse transformed sample point having an x' coordinate value, a y' coordinate value, and a z' coordinate value;

(j) determining a beginning neighborhood point;

(k) determining a neighborhood of eight source voxels surrounding said beginning neighborhood point, wherein each of said neighborhood of eight source voxels has a source value;

(l) determining a delta x value;

(m) determining a delta y value;

(n) determining a delta z value;

(o) determining a blended source value for said inverse transformed sample point through trilinear interpolation of said source values of said neighborhood of eight source voxels, said delta x value, said delta y value, and said delta z value, wherein said blended source value for said inverse transformed sample point is used in the further rendering process for said inverse transformed sample point;

(p) deriving a next transformed sample point along said ray by adding said iC value to said x' coordinate value, adding said jC value to said y' coordinate value, and adding said kC value to said z' coordinate value;

(q) repeating steps (k) through (o) for said next transformed sample point; and (r) repeating steps (p) and (q) until all of said next transformed sample points along said ray have been processed.

21. The method of claim 20 wherein step (h) further comprises converting said z-vector component of said combined inverse matrix to integer values by multiplying each of said iC value, said jC value, and said kC value by 65536, yielding an iF value, a jF value, and a kF value.

22. The method of claim 21 wherein step (o) is replaced with the following new step (o):

(o) deriving a next transformed sample point along said ray by adding said iF value to said x' coordinate value, adding said jF value to said y' coordinate value, and adding said kF value to said z' coordinate value.

23. The method of claim 20 wherein step (j) further comprises the following steps (j1) and (j2):

(j1) encoding said x' coordinate value, said y' coordinate value, and said z' coordinate value of said inverse transformed sample point into a fixed point format, said fixed point format having a scalar portion having a first predetermined number of bits and a fraction portion having a second predetermined number of bits; and (j2) shifting each of said x' coordinate value, said y' coordinate value, and said z' coordinate value of said inverse transformed sample point said predetermined number of bits to the right, yielding said beginning neighborhood point, said beginning neighborhood point having an integer component i, an integer component j, and an integer component k.

24. The method of claim 23 wherein said first predetermined number of bits and said second predetermined number of bits is 16.

25. The method of claim 20 further comprising the following step (a1) performed before step (a):

(a1) creating a fractional lookup table, a y-direction lookup table, and a z-direction lookup table.

26. The method of claim 25 wherein steps (l), (m), (n), and (o) further comprise the following steps (l1), (m1), (n1), and (o1):

(l1) determining said delta x value by masking said x' coordinate value of said inverse transformed sample point and accessing said fractional lookup table;

(m1) determining said delta y value by masking said y' coordinate value of said inverse transformed sample point and accessing said fractional lookup table;

(n1) determining said delta z value by masking said z' coordinate value of said inverse transformed sample point and accessing said fractional lookup table; and (o1) determining said blended source value by accessing said y-direction lookup table and said z-direction lookup table to aid trilinear interpolation.

27. The method of claim 20 wherein step (o) further comprises the following step (o1):

(o1) compositing said blended source value for said inverse transformed sample point.

28. The method of claim 20 further comprising the step of:

(s) getting a next beginning destination voxel of a next ray and repeating steps (a) through (r) until all said next rays have been processed.

\* \* \* \* \*